(12) United States Patent
Kaehny et al.

(10) Patent No.: US 10,381,752 B2
(45) Date of Patent: Aug. 13, 2019

(54) MODULE CONNECTOR

(71) Applicant: TE Connectivity Germany GmbH, Bensheim (DE)

(72) Inventors: Frank Kaehny, Lautertal (DE); Martin Listing, Langen (DE); Wilhelm Grzywok, Munich (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 16/013,409

(22) Filed: Jun. 20, 2018

(65) Prior Publication Data
US 2018/0375227 A1 Dec. 27, 2018

(30) Foreign Application Priority Data
Jun. 21, 2017 (DE) .................. 10 2017 210 425

(51) Int. Cl.
*H01M 2/20* (2006.01)
*H01R 4/34* (2006.01)
(Continued)

(52) U.S. Cl.
CPC ............... *H01R 4/34* (2013.01); *H01M 2/20* (2013.01); *H01R 11/11* (2013.01); *H01R 11/283* (2013.01);
(Continued)

(58) Field of Classification Search
CPC ... H01R 4/34; H01R 4/64; H01R 4/30; H01R 11/283; H01R 11/11; H01R 11/288;
(Continued)

(56) References Cited

U.S. PATENT DOCUMENTS 2,688,105 A * 8/1954 Hasselhorn ........ H01R 13/6666
174/145
3,800,064 A * 3/1974 Lusk ..................... H02G 15/06
174/11 BH
(Continued)

FOREIGN PATENT DOCUMENTS

DE 10 2014 203 128 A1 8/2015
DE 10 2015 216 543 A1 3/2017
DE 10 2016 206 378 A1 10/2017

OTHER PUBLICATIONS

Machine translation of Abstract of DE102014203128, dated Aug. 27, 2015, 1 page.
(Continued)

*Primary Examiner* — Gary F Paumen
(74) *Attorney, Agent, or Firm* — Barley Snyder (57) ABSTRACT

A module connector comprises a first connector including a first conductor attached to the first connector at a conductor point of the first connector and a second connector capable of being electrically connected with the first connector and including a second conductor attached to the second connector at a conductor point of the second connector. The first connector and the second connector each have an affixing element and a touch protection disposed on a connection side. The touch protection includes an outer electrically insulated collar and an electrically insulated protection pin surrounded by the collar. A current bridge is disposed between the collar and the protection pin and electrically connects the conductor point of the first connector with the conductor point of the second connector. The collar and the protection pin project beyond the current bridge.

17 Claims, 10 Drawing Sheets

(51) Int. Cl.
*H01R 11/11* (2006.01)
*H01R 11/28* (2006.01)
*H01R 13/44* (2006.01)
*H01R 101/00* (2006.01)
*H01R 13/447* (2006.01)
*H01R 13/621* (2006.01)

(52) U.S. Cl.
CPC ........... *H01R 13/44* (2013.01); *H01R 13/447* (2013.01); *H01R 13/621* (2013.01); *H01R 11/288* (2013.01); *H01R 13/6215* (2013.01); *H01R 2101/00* (2013.01); *H01R 2201/26* (2013.01)

(58) Field of Classification Search
CPC .... H01R 13/447; H01R 13/44; H01R 13/621; H01R 13/6215; H01R 2101/00; H01R 2201/26; H01M 2/20
USPC .................................................. 439/801, 680
See application file for complete search history.

(56) References Cited

U.S. PATENT DOCUMENTS

| | | | | |
|---|---|---|---|---|
| 3,960,427 | A | * | 6/1976 | Piaget ...................... H01R 4/70 439/147 |
| 4,683,390 | A | * | 7/1987 | Imori ................... H02K 11/046 310/71 |
| 4,736,999 | A | * | 4/1988 | Marks ................ H01R 13/6456 439/218 |
| 4,772,226 | A | * | 9/1988 | Schlesinger ........... H01R 13/64 439/680 |
| 2012/0060885 | A1 | * | 3/2012 | Makansi .................. H01C 1/16 136/206 |
| 2018/0069341 | A1 | * | 3/2018 | Sakaguchi ........... H01R 13/512 |

OTHER PUBLICATIONS

Abstract of corresponding document related to DE102015216543: EP3136511, dated Mar. 2, 2017, 1 page.
Abstract of corresponding document related to DE102016206378: WO2017178147, dated Oct. 19, 2017, 2 pages.

* cited by examiner

MODULE CONNECTOR

CROSS-REFERENCE TO RELATED APPLICATION

This application claims the benefit of the filing date under 35 U.S.C. § 119(a)-(d) of German Patent Application No. 102017210425.2, filed on Jun. 21, 2017.

FIELD OF THE INVENTION

The present invention relates to a module connector and, more particularly, to a module connector for connecting a plurality of modules of a battery.

BACKGROUND

Module connectors are used to connect a plurality of different modules which form a battery, for example, a battery of a vehicle with an electric drive. In such modules, high voltages and currents occur which are dangerous for a user, such as a mechanic. Known module connectors are not sufficiently designed to prevent the user from touching current-carrying components of the module connector.

SUMMARY

A module connector comprises a first connector including a first conductor attached to the first connector at a conductor point of the first connector and a second connector capable of being electrically connected with the first connector and including a second conductor attached to the second connector at a conductor point of the second connector. The first connector and the second connector each have an affixing element and a touch protection disposed on a connection side. The touch protection includes an outer electrically insulated collar and an electrically insulated protection pin surrounded by the collar. A current bridge is disposed between the collar and the protection pin and electrically connects the conductor point of the first connector with the conductor point of the second connector. The collar and the protection pin project beyond the current bridge.

BRIEF DESCRIPTION OF THE DRAWINGS

The invention will now be described by way of example with reference to the accompanying Figures, of which.

DETAILED DESCRIPTION OF THE EMBODIMENT(S)

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

A module connector 1 according to an embodiment is shown in FIGS. 1-5. The module connector 1 is connected by connecting a first connector 3, 31 to a second connector 3, 32 along a connection direction 21.

In order to prevent the user who is handling the module connector 1 from being put at risk, each of the connectors 3 has a touch protection 8 shown in FIGS. 1 and 3-5.

The touch protection 8 includes an external, electrically insulated collar 9 and an electrically insulated protection pin 10 which is surrounded by the collar 9.

In each connector 3, a current bridge 11 is located between the collar 9 and the protection pin 10. The current bridge 11 connects two conductor points 4 at the connectors 3. The conductor point 4 of each connector 3 is the point at which a conductor 5 is connected to the connector 3. The collar 9 and the protection pin 10 project beyond the current bridge 11, such that the current bridge 11 is inaccessible to the user; the user cannot reach the current bridge 11 with a finger, for example, since the collar 9 and the protection pin 10 are in the way. In particular, a finger of the user can be prevented from touching the current-carrying components, which is simulated, for example, by a test finger according to the normal standards, for example according to DIN EN 60529:2000, which specifies a length of 80 mm and a diameter of 12 mm for the test finger. Further relevant standards can be: VDE 0470 Part 2, IEC/EN 61032, VDE 0470 Part 1 or IEC/EN 60529, IEC/EN 60950, IEC 61010, IEC/EN 60335, IEC/EN 60745-1, IEC/EN 60034-5 and IEC/EN 60065.

Figure 1:
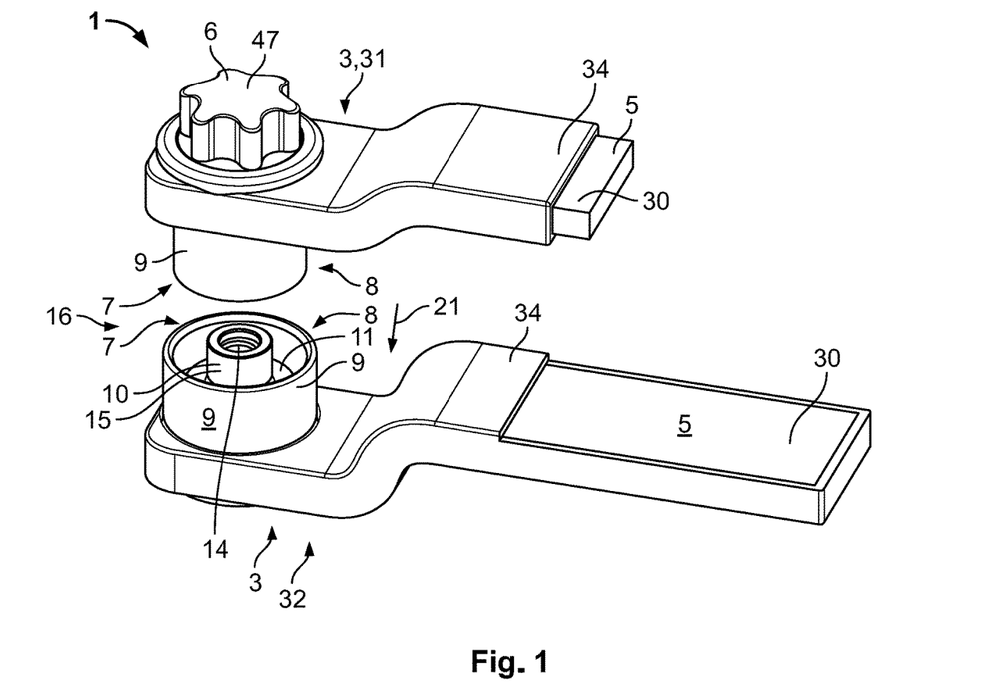
FIG. 1 is a perspective view of a module connector according to an embodiment in an open state.
Figure 2:
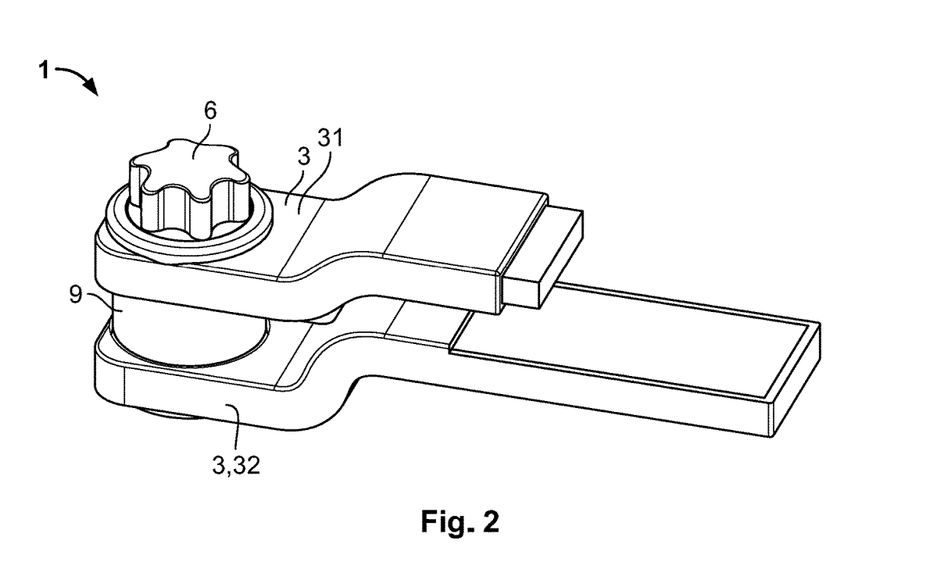
FIG. 2 is a perspective view of the module connector of FIG. 1 in a connected state.
Figure 3:
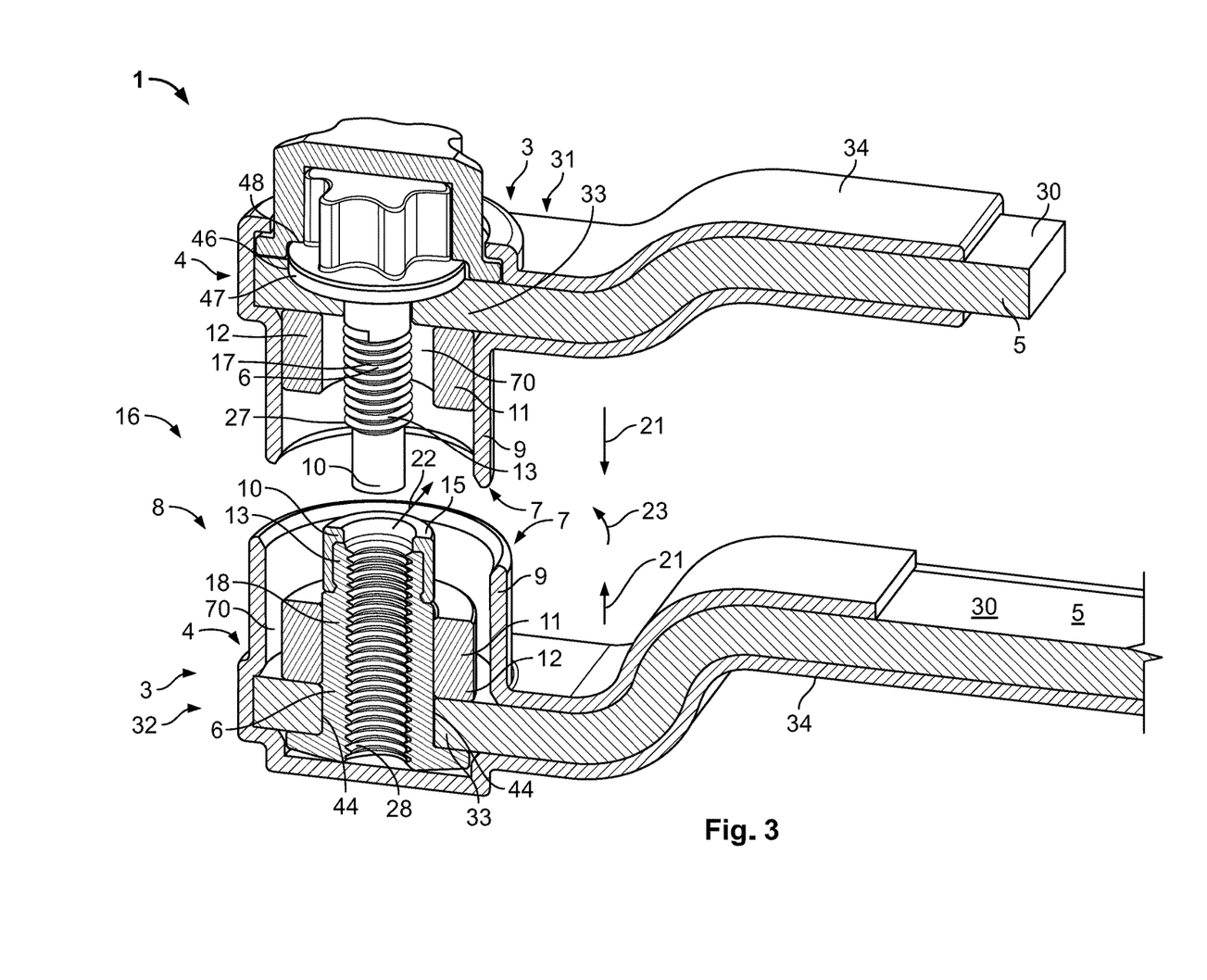
FIG. 3 is a sectional perspective view of the module connector of FIG. 1 in the open state.
Figure 4:
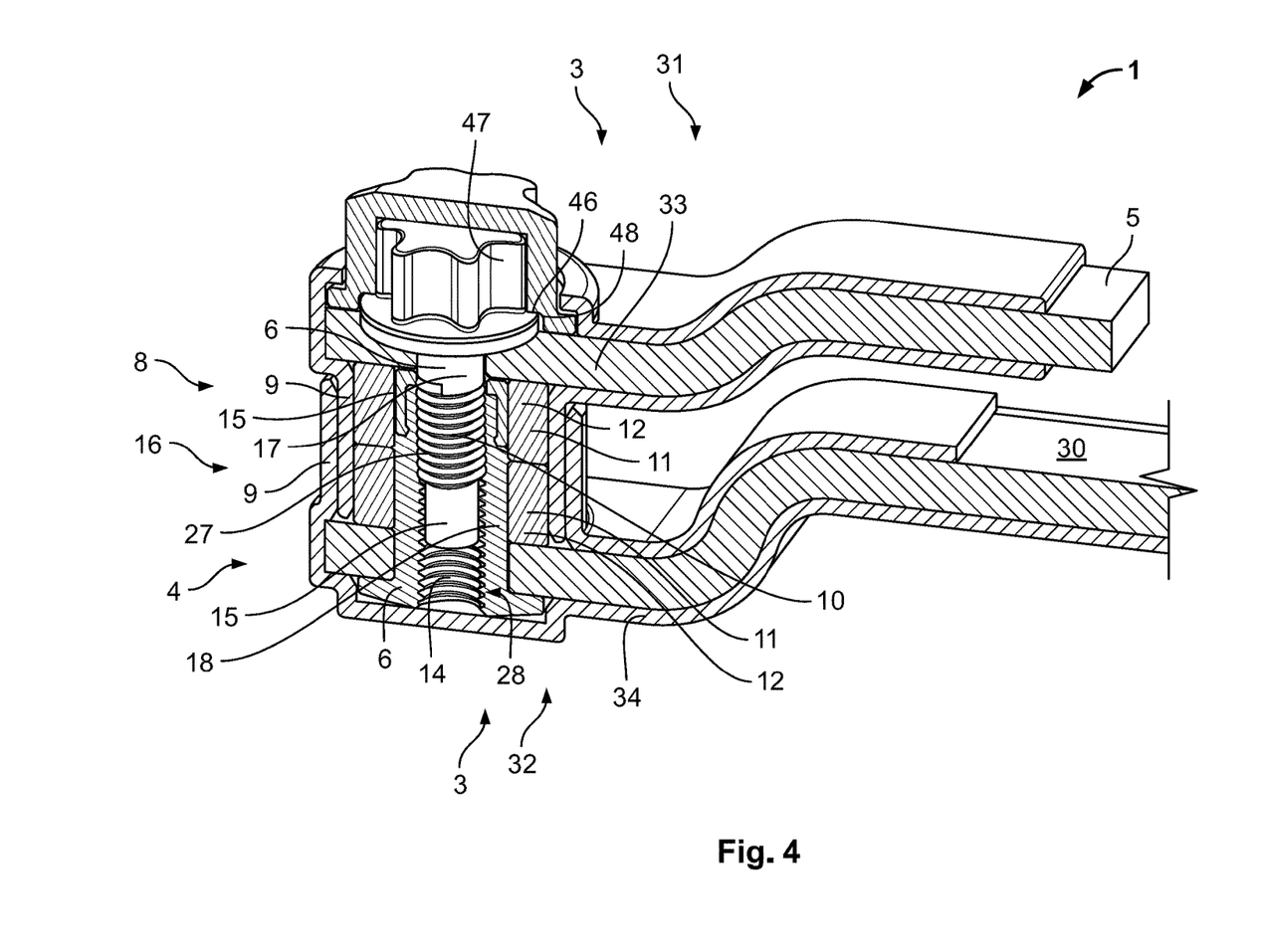
FIG. 4 is a sectional perspective view of the module connector of FIG. 1 in the connected state.

In order to achieve a compact configuration, the affixing elements 6 are arranged at least partially inside the current bridge 11. The current bridges 11 are each configured as contact sleeves 12 which surround the protection pin 10, as shown in FIGS. 3 and 4. As a result, the current bridges 11 cannot go missing.

When the first connector 3, 31 is connected to the second connector 3, 32 along the connection direction 21, a first conductor 5 which is attached to the first connector 3, 31 is electrically connected via the current bridges 11 to a second conductor 5 attached to the second connector 3, 32. The current bridge 11 at the second connector 3, 32 is spaced apart from the collar 9 of the second connector 3, 32 by a receptacle 70, as shown in FIG. 3, such that the collar 9 of the first connector 3, 31 can be inserted between the current bridge 11 and the collar 9 of the second connector 3, 32.

Figure 5:
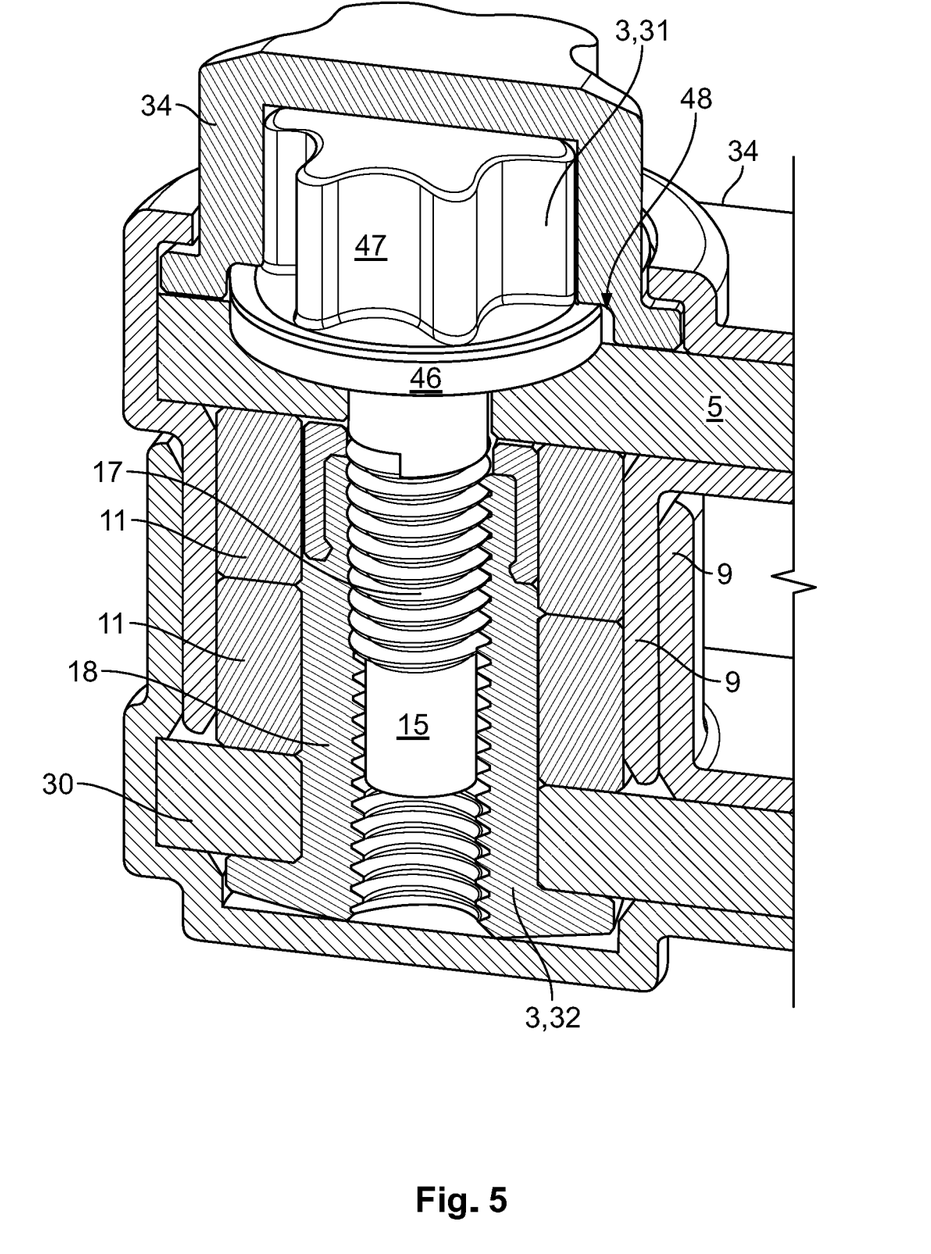
FIG. 5 is a detailed sectional perspective view of a portion of FIG. 4.

In order to affix the two connectors 3 to one another, the connectors 3 each have an affixing element 6 as shown in FIGS. 3-5. The affixing elements 6 of the connectors 3 are complementary to one another. At the first connector 3, 31, the affixing element 6 is a screw 17, and at the second connector 3, 32, the affixing element 6 is a nut 18 or a threaded sleeve. The screw 17 and nut 18 each engage behind the conductor 5, such that a form-fitting connection is established by the engaging of the affixing elements 6. The affixing elements 6 can therefore be connected to one another via a screw connection 16. For this purpose, an internal thread 28 is present in the nut 18 and an external thread 27 is present in the screw 17. In order to retain the screw 17, a flange 46 is present on its head 47. The flange 46 protrudes laterally and is retained by a stop 48 at the first connector 3, 31. Between the current bridge 11 and the protection pin 10 of the first connector 3, 31, there is a recess or receptacle 70 into which the affixing element 6 of the second connector 3, 32 is inserted.

In the shown embodiment, a projecting end 13 of each of the affixing elements 6 that projects beyond the current bridge 11 forms the protection pin 10 of the affixing element 6; the construction is kept simple by this dual function. In order to keep the construction of the module connector 1 compact, the nut 18 which forms one protection pin 10 has a central receptacle 14 receiving the other protection pin 10 in the shape of the screw 70.

In order to achieve an electrical insulation, the protection pins 10 each have an electrically insulating cap 15 at a connection side 7, as shown in FIGS. 3 and 4. The cap 15 on the nut 18 has an opening which enables the screw 17 to access the receptacle 14, but is sufficiently small to prevent the ingress of a finger. In order to achieve a good insulation and at the same time make the affixing secure, the protection pins 10 each protrude beyond the collar 9 in the connection direction 21.

The current bridges 11, the collars 9, and the protection pins 10 are each configured in a rotationally symmetrical manner, such that the two connectors 3 can be affixed to one another at any rotation angle along a circumferential direction 23 which runs around the connection direction 21. In an embodiment, the collars 9 are continuous along the circumferential direction 23.

In the embodiment shown in FIGS. 1-5, the two conductors 5 are each formed as conductor braids 30. In order to enable a secure attachment, an end 33 of the conductor braid 30 arranged in the connector 3 is compacted. In order to achieve a stable shape, the individual wires of the braid 30 can be welded, soldered or glued to one another, for example.

The connectors 3 further comprise insulations 34, as shown in FIGS. 1-5, preventing touching of the conductors 5 from outside the aforedescribed direct connection region. In order to achieve sufficient protection, the insulation 34 can be partially integral with parts of the touch protection 8, in particular the collar 9.

The module connector 1 is particularly suitable for connecting conductors 5 to one another which have a good current conductivity but are not particularly mechanically stable. This can be the case, for example, if copper is used as a material of the conductors 5. The affixing of the two conductors 5 via the affixing elements 6 then takes place with materials which are mechanically stable but have poorer electrical conductivity, such as steel. In an embodiment, the conductors 5 are coated to protect against corrosion.

Figure 6:
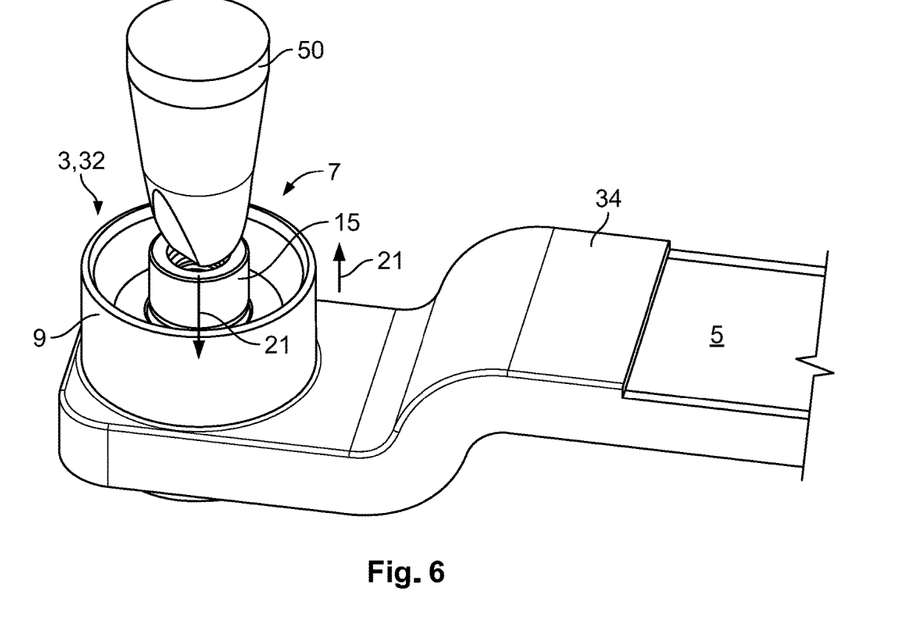
FIG. 6 is a perspective view of a second connector of the module connector of FIG. 1 with a test finger at a first location.
Figure 7:
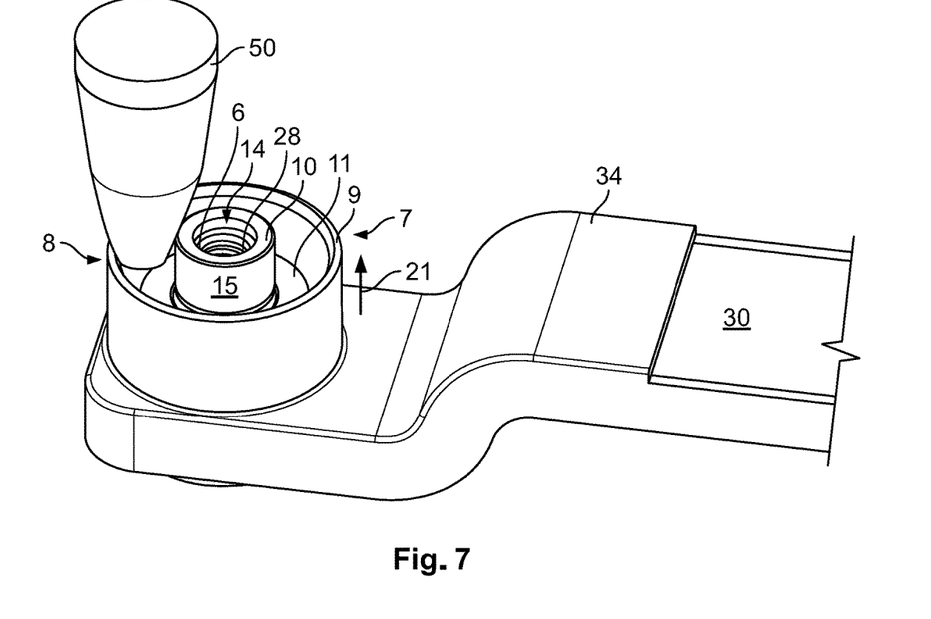
FIG. 7 is a perspective view of the second connector of the module connector of FIG. 1 with the test finger at a second location.
Figure 8:
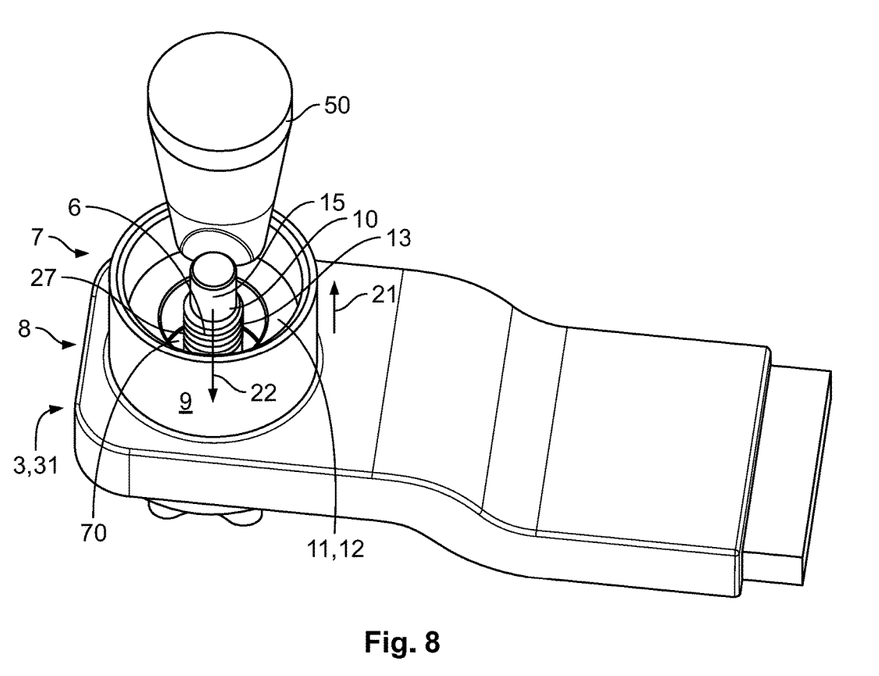
FIG. 8 is a perspective view of a first connector of the module connector of FIG. 1 with the test finger.

The protection function of the module connector 1 is shown in FIGS. 6-8. By virtue of the cap 15, a test finger 50 cannot encroach on elements of the screw 17 which are conductive. Furthermore, by virtue of the spacing along the connection direction 21, contact with the current bridge 11 is also not possible since the test finger 50 cannot enter sufficiently far between the collar 9 and the protection pin 10.

Figure 9:
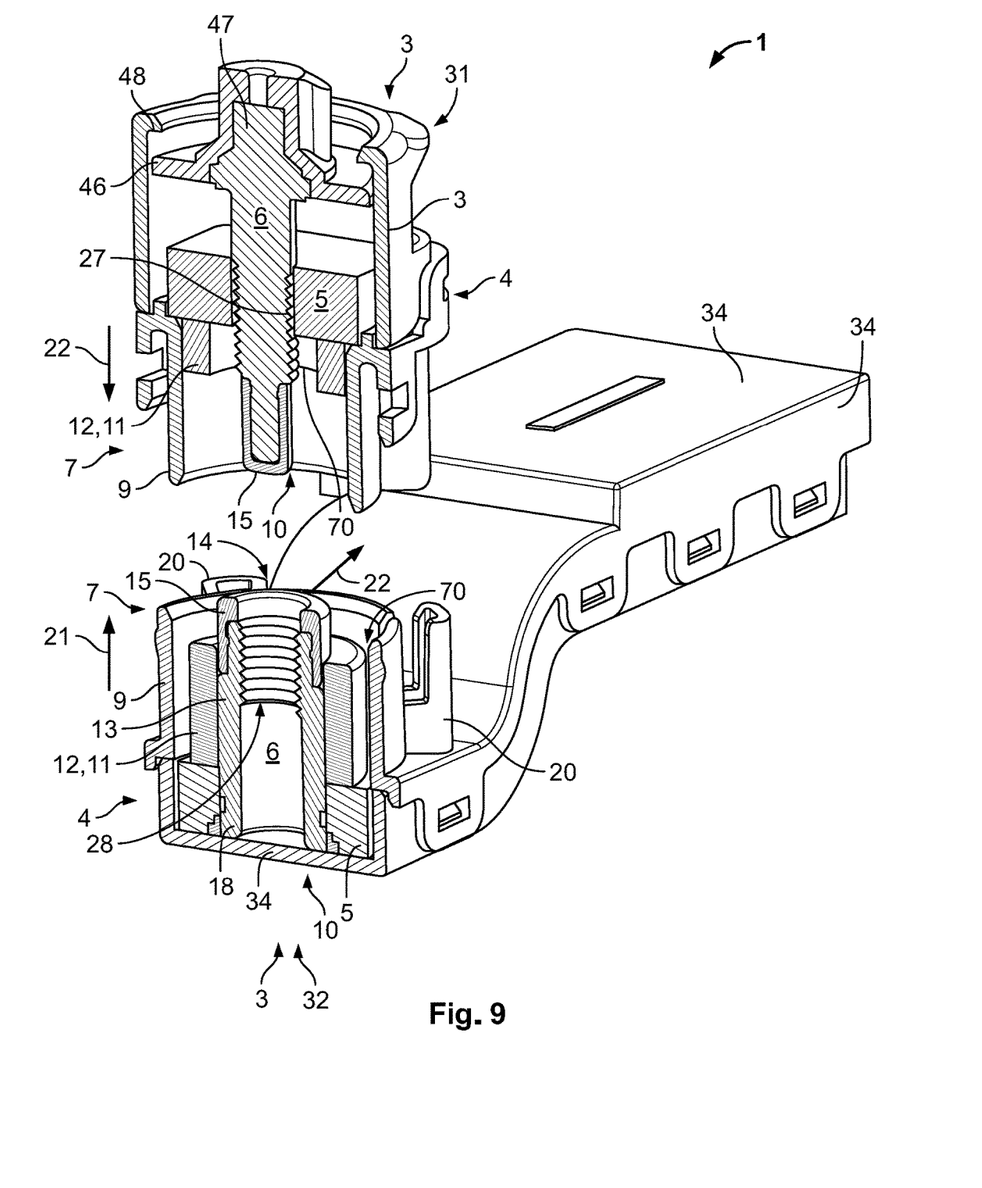
FIG. 9 is a sectional perspective view of a module connector according to another embodiment.
Figure 10:
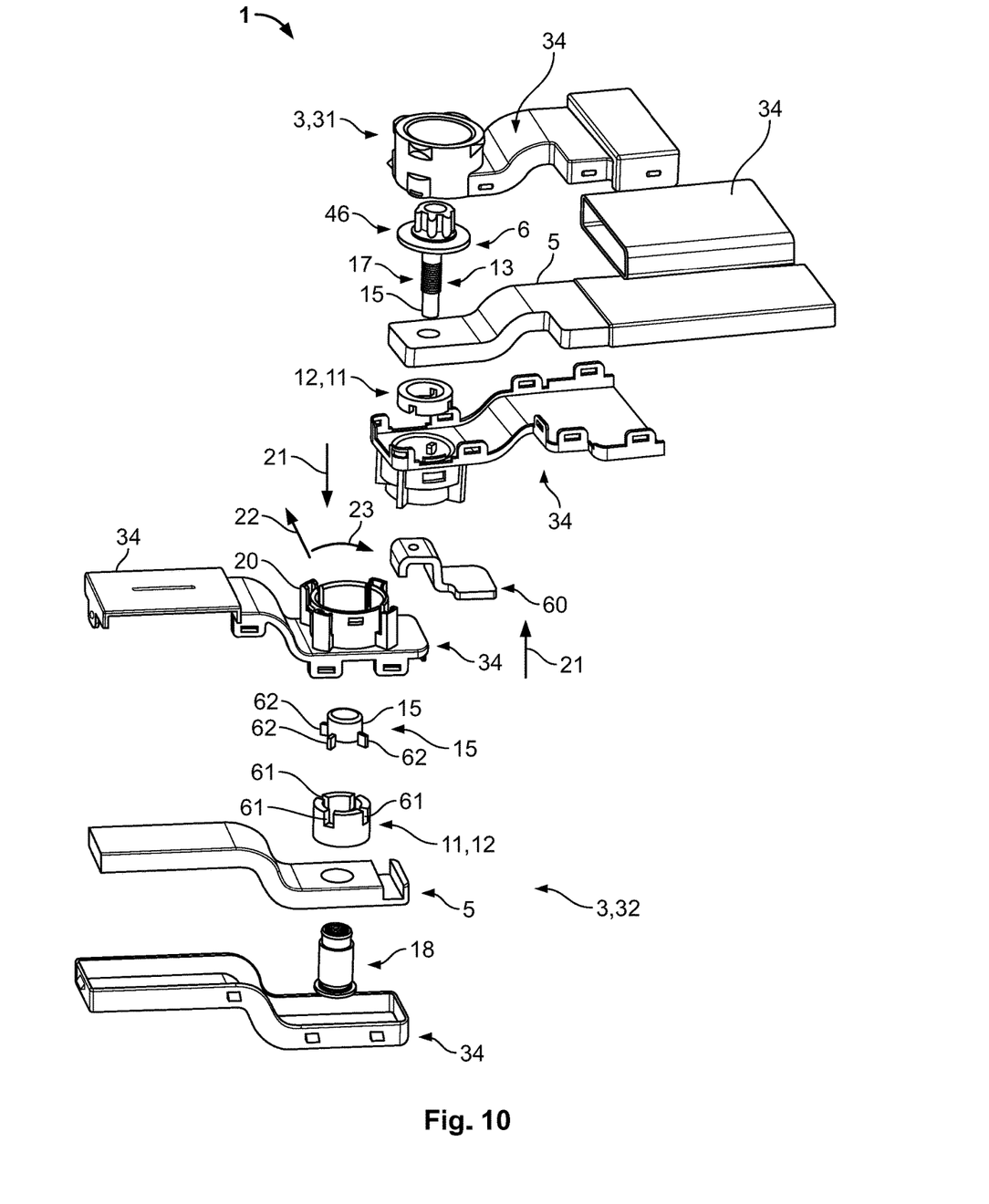
FIG. 10 is an exploded perspective view of the module connector of FIG. 9.

A module connector 1 according to another embodiment is shown in FIGS. 9 and 10. The features already described above with reference to the embodiment of FIGS. 1-8 will not be repeated in the description of the second embodiment.

In contrast to the first embodiment, the stop 48 of the second embodiment of the module connector 1 is located further outside, such that the affixing element 6 of the first connector 3, 31 has a degree of play along the connection direction 21. The two connectors 3 are firstly connected to one another and an electrical connection can be produced via the current bridge 11 before the affixing elements 6 are screwed onto one another.

The two current bridges 11 further have different lengths along the connection direction 21, as shown in FIGS. 9 and 10. The current bridge 11 at the first connector 3, 31 is shorter and is located further inside the connector 3, 31 along the connection direction 21, because, at the first connector 3, 31, the gap between the collar 9 and the protection pin 10 is greater than at the second connector 3, 32, since a screw is used at the first connector 3, 31, this screw being screwed into the wider nut 18 at the second connector 3, 32.

The connectors 3 of the second embodiment have a coding 20 as shown in FIGS. 9 and 10. The connectors 3 can only be connected in four angular positions which differ by 90° rotation about the connection direction 21 due to the coding 20, establishing a secure positioning.

As shown in FIG. 10, the current bridge 11 of the second connector 3, 32 has retaining elements 61 in the form of recesses that cooperate with retaining elements 62 of the caps 15 for secure positioning. It can further be seen in FIG. 10 that the current bridge 11 of the second connector 3, 32 has retaining elements 61 in the form of recesses, which cooperate with retaining elements 62 on the caps 15 for secure positioning.

Figure 11:
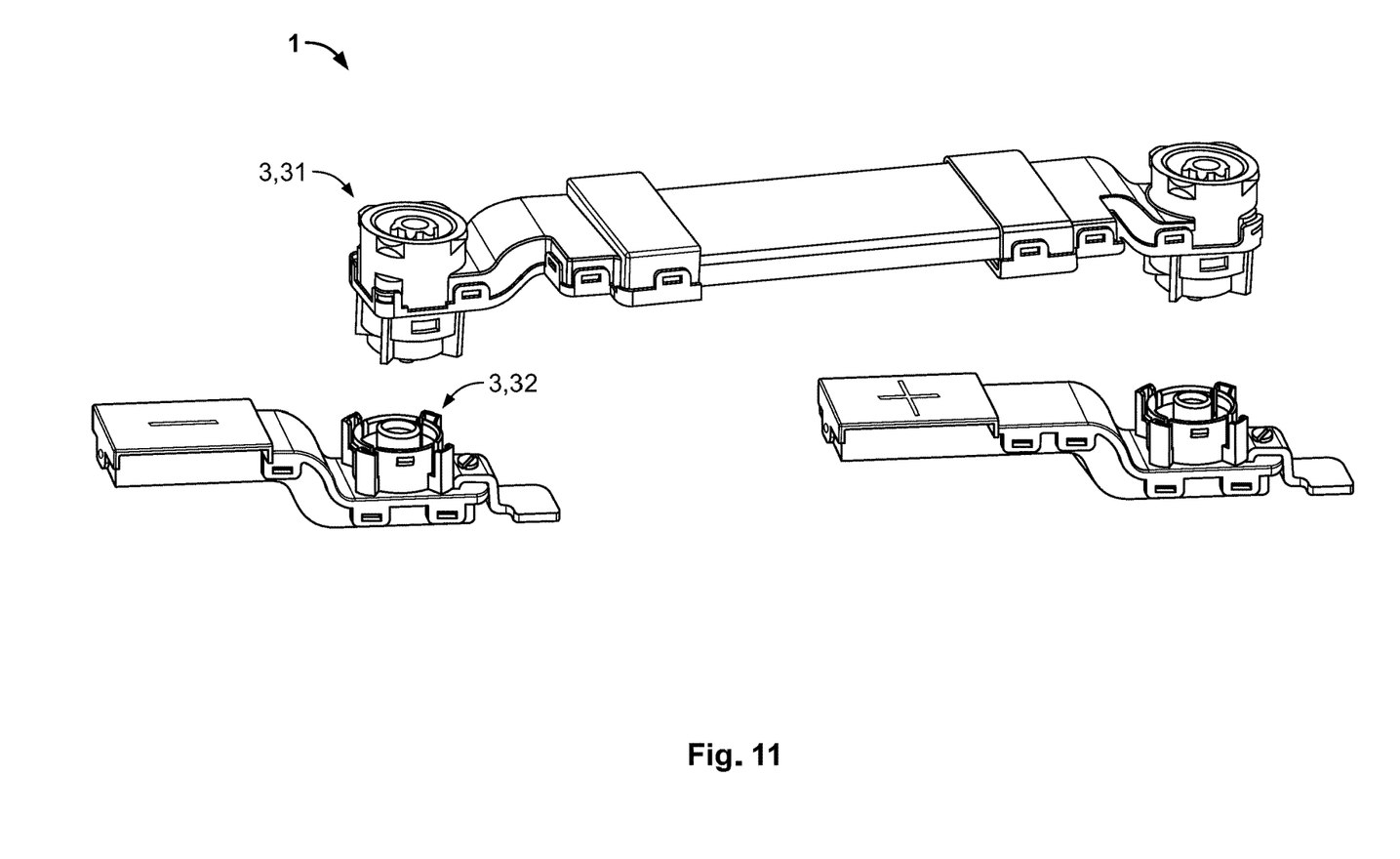
FIG. 11 is a perspective view of the module connector of FIG. 9.
Figure 12:
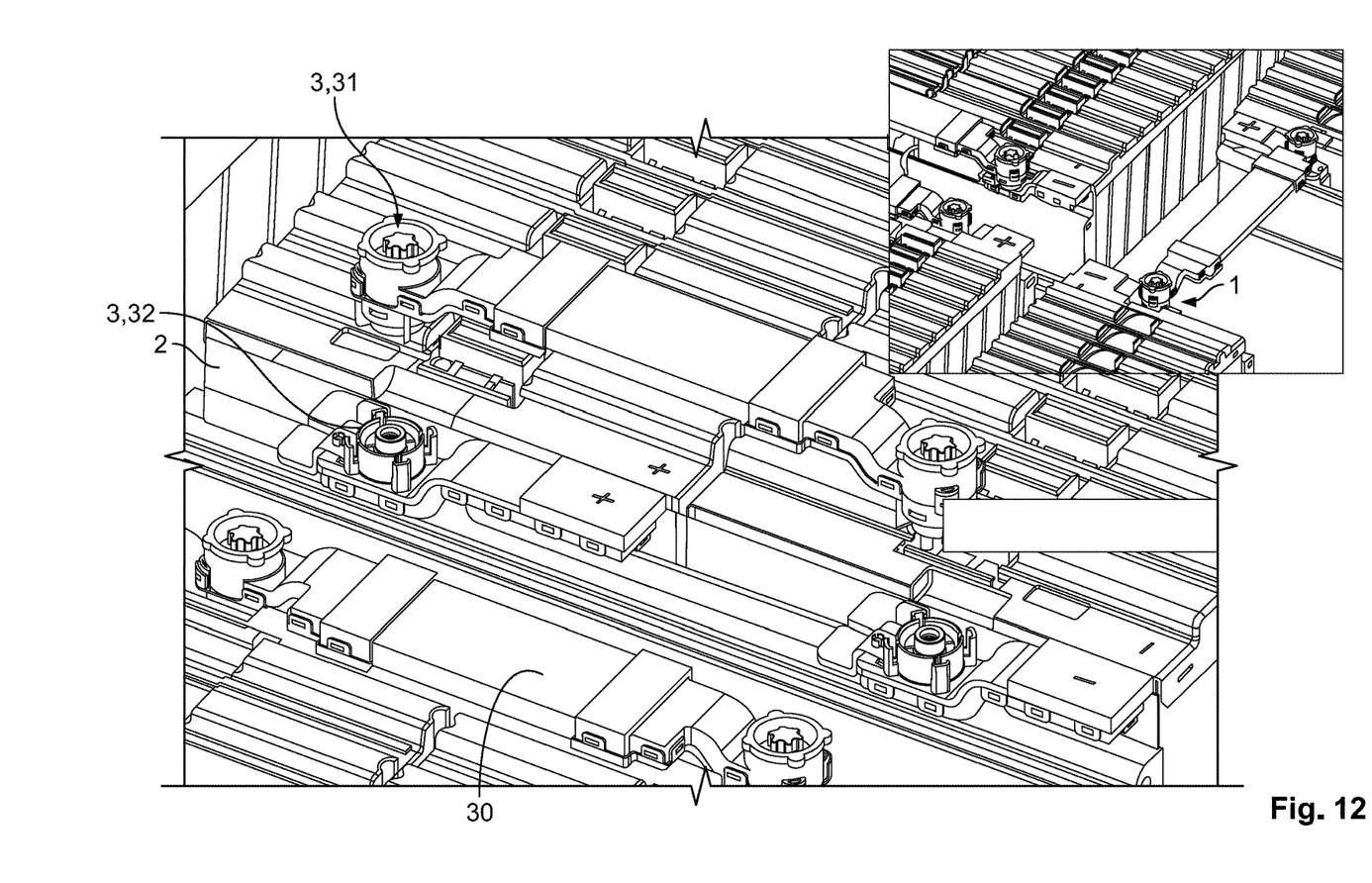
FIG. 12 is a perspective view of the module connector of FIG. 9 on a battery.

The use of the second embodiment of the module connector 1 is shown in FIGS. 11 and 12. By virtue of the coding 20, a vertical arrangement is possible in a secure manner. As shown in FIG. 12, the module connector 1 of any embodiment can be used to connect the modules in a battery 2 and thus to produce higher currents or voltages, for example.

What is claimed is:

1. A module connector, comprising:
   a first connector including a first conductor attached to the first connector at a conductor point of the first connector, the first connector having an affixing element and a touch protection disposed on a connection side of the first connector, the touch protection of the first connector including an outer electrically insulated collar and an electrically insulated protection pin surrounded by the collar;
   a second connector capable of being electrically connected with the first connector and including a second conductor attached to the second connector at a conductor point of the second connector, the second connector having an affixing element capable of engaging the affixing element of the first connector and a touch protection disposed on a connection side of the second connector facing the connection side of the first connector, the touch protection of the second connector including an outer electrically insulated collar and an electrically insulated protection pin surrounded by the collar; and a current bridge disposed between the collar and the protection pin of at least one of the touch protection of the first connector and the touch protection of the second connector and electrically connecting the conductor point of the first connector with the conductor point of the second connector, the collar and the protection pin of the least one of the touch protection of the first connector and the touch protection of the second connector project beyond the current bridge, the protection pin of the touch protection of the first connector is formed by a projecting end of the affixing element of the first connector that projects beyond the current bridge and the protection pin of the touch protection of the second connector is formed by a projecting end of the affixing element of the second connector that projects beyond the current bridge.

2. The module connector of claim 1, wherein the protection pin of the touch protection of the first connector projects beyond the collar of the touch protection of the first connector and/or the protection pin of the touch protection of the second connector projects beyond the collar of the touch protection of second connector.

3. The module connector of claim 1, wherein the current bridge is a contact sleeve.

4. The module connector of claim 3, further comprising a plurality of current bridges, one of the current bridges is disposed in each of the first connector and the second connector.

5. The module connector of claim 1, wherein the protection pin of the touch protection of the second connector has a central receptacle receiving the protection pin of the touch protection of the first connector.

6. The module connector of claim 1, wherein an electrically insulating cap is disposed at the connection side of at least one of the protection pin of the touch protection of the first connector and the protection pin of the touch protection of the second connector.

7. The module connector of claim 1, wherein the collar of the touch protection of the first connector and the collar of the touch protection of the second connector are rotationally symmetrical.

8. The module connector of claim 7, wherein the current bridge is rotationally symmetrical.

9. The module connector of claim 4, wherein the affixing element of the first connector is disposed at least partially inside the current bridge and the affixing element of the second connector is disposed at least partially inside the current bridge.

10. The module connector of claim 1, wherein the affixing element of the first connector engages the affixing element of the second connector by a screw connection.

11. The module connector of claim 10, wherein the affixing element of the first connector is a screw having a flange that protrudes laterally from a head of the screw.

12. The module connector of claim 11, wherein the flange is retained by a stop of the first connector.

13. The module connector of claim 1, wherein the first connector and the second connector each have a coding that enables connection of the first connector and the second connector only in a plurality of specific angular positions with respect to a rotation about a connection direction between the first connector in the second connector.

14. The module connector of claim 1, wherein at least one of the first connector and the second connector includes a connector braid with a compacted end.

15. The module connector of claim 1, wherein the second connector has a receptacle between the current bridge and the collar of the touch protection of the second connector, the receptacle receiving the collar of the touch protection of the first connector.

16. The module connector of claim 15, wherein the first connector has a receptacle between the current bridge and the protection pin of the touch protection of the first connector, the receptacle of the first connector receiving the affixing element of the second connector.

17. The module connector of claim 1, wherein the module connector connects a plurality of batteries of a vehicle with an electric drive.

* * * * *